Figure 1:
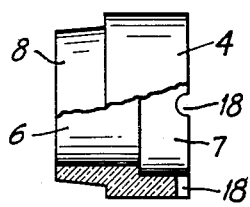

Feb. 18, 1947.  T. NELSON  2,416,204
VENTED MOLDING FERRULE FOR ELECTRIC STUD WELDING
Filed Nov. 19, 1943

INVENTOR
TED NELSON
BY Charles S. Evans
HIS ATTORNEY

Patented Feb. 18, 1947

2,416,204

UNITED STATES PATENT OFFICE 2,416,204

VENTED MOLDING FERRULE FOR ELECTRIC STUD WELDING

Ted Nelson, San Leandro, Calif.

Application November 19, 1943, Serial No. 510,981

3 Claims. (Cl. 219—8)

My invention relates to the welding of studs to a plate; and the principal object of the invention is the provision of an improved ferrule for shielding the end of the stud during welding.

A more limited object of the invention is the provision of a shield of the character described which does not require accurate setting for perfect welds but within a wide range of setting automatically assumes the desired position relative to the stud and plate and the arc therebetween.

My invention possesses other objects and features of value, some of which with the foregoing will be set forth in the following description of the invention. It is to be understood that I do not limit myself to the showing made by the said description and said drawing as I may adopt variant forms of the invention within the scope of the appended claims.

Figure 2:
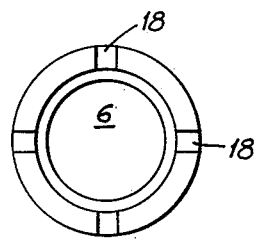
Figure 3:
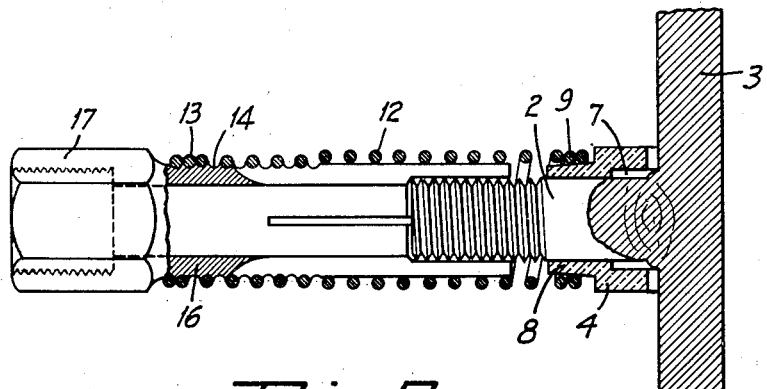

Referring to the drawing which is on an enlarged scale:

Figure 1 is a side elevation; and Figure 2 is an end view of the ferrule of my invention. Figure 3 is a side elevation of the whole assembly of which my ferrule is a part, in position against a vertical plate to which the stud is to be welded. The plate is shown in vertical section, and the ferrule is shown in the position it occupies at the moment the weld is made.

In various types of steel construction but especially in ship building, it is necessary to weld enormous numbers of studs to deckplates, beams and other structural members. In order to preserve and protect the areas on stud and plate which are under treatment, as well as to conserve the arc-generated heat at the locus of welding, I provide a surrounding sheath or ferrule. This device also provides means for confining the flux, molten metal and hot gases to the space immediately surrounding the stud end.

A perfect weld depends on a proper balancing of all of these factors. For example while there should be some confinement of the hot gases to the immediate vicinity of the weld, there cannot be too close or complete confinement. Evenly spaced vent passages through the wall of the ferrule around the weld permit escape of some of the gases while spattering and magnetic blow is prevented.

In the application of my invention which is illustrated herein, the stud 2 is to be welded to the vertical plate 3. Closely associated with the heating of the stud and plate is the enclosure about the end of the stud and the arc while the weld is being made. This is best provided by a sleeve or ferrule 4 of porcelain or other refractory material preferably shaped as indicated in Figures 1 and 2. The ferrule slides readily over the stud, but the central bore 6 which is slightly larger than the stud with which the ferrule is used is enlarged somewhat so that a small chamber 7 encloses the end of the stud.

One end of the ferrule is formed with a neck 8 preferably slightly tapered to receive the close coils 9 at one end of the widely wound spring 12 with which the ferrule is held about the stud. The other end of the spring is also formed with close coils 13; and the pitch of the coils and the gauge of the wire are preferably such as to correspond with a shallow thread 14 cut for a short distance well back from the outer ends, in the jaws 16 of the chuck 17 of the welding machine.

As shown in Figure 3, the threaded end of the stud is resiliently gripped in the chuck jaws, and the holding spring pushed on to the smooth ends of the jaws to the threads. A ferrule is then slipped over the stud and mounted in the free end of the spring whose tight coils 9 resiliently grip the tapered neck 8. Spring and ferrule are then turned on the chuck to adjust the ferrule to a position in which it is flush with the stud end, or projects as much as ¼ inch past the stud end. This adjustment is not a critical one, and may be made by the operator rapidly and with scant attention. It is with this end in view and to effect the material increase in production which approximate instead of careful adjustment makes possible, that I have provided vent passages in the base of the ferrule.

Extending radially across the end of the ferrule wall and spaced evenly therearound are the passages or recesses 18, which function to allow a certain amount of the hot gases formed at the moment of welding to escape. Thus when the stud is pressed against the plate, and then withdrawn a short distance to draw the welding arc, the ferrule is resiliently pressed against the plate so that it encloses the end of the stud when the weld is made. At the moment of the weld, a portion of the hot gases formed escape evenly from all sides through the vent passages, instead of blowing out and spattering hot metal in haphazard fashion from one side or the other with consequent disturbance of an even and complete fusing of the metal which is necessary to a good weld.

It will be understood that the skilled operator when using ferrules without vents, may be careful adjustment of the ferrules relative to the stud end, allow for a certain desired escape of gases and secure consistently good results, but the need for such adjustment slows his work, and his net progress is still further reduced by an occasional faulty weld. With my new vented ferrule, the matter is largely removed from the field of skilled adjustment and a material gain in speed is accomplished, with substantially perfect results.

In whatever position my device is used there is even heating of the areas to be joined, magnetic blow is eliminated, and the molten metal is closely confined about the fusing parts, running about the base of the stud in an evenly distributed fillet marked by four small beads where the metal enters the vent passages. This even distribution of the fillet of course contributes heavily to the strength of the union, and is promoted by the effect of the vents in releasing and equalizing pressure within the small chamber surrounding the weld.

At the completion of a weld, the welding machine is moved to a new location, the chuck jaw being pulled free of the resiliently engaged, and now welded stud. The spring coils resiliently engaging the tapered neck of the ferrule also pull free, the taper aiding in this disengagement. This leaves the ferrule or what is left of it around the base of the stud. In cases where the stud is set through a hole in a wooden deck, the ferrule is left undisturbed. If necessary to clear the stud so that a pipe bracket may be mounted on it, a hammer blow will break up the ferrule.

By the terminology used in the claims relating to the bore having "a smooth continuous surface," I mean a surface in which no re-entrant portions occur.

I claim:

1. A ferrule for use in welding a stud to a plate, comprising a sleeve having a bore therethrough, one end of said bore having a smooth continuous surface, the cross-section of the bore at said one end being only enough larger than the stud to permit it to pass freely over the stud, the bore at the other end being enlarged to provide a narrow peripheral molding chamber around the welding end of the stud, the wall of the bore at said other end having a plurality of openings therethrough.

2. The structure set forth in claim 1 wherein said openings traverse the edge of said wall.

3. The structure set forth in claim 1 wherein said bore is cylindrical.

TED NELSON.

REFERENCES CITED

The following references are of record in the file of this patent:

UNITED STATES PATENTS

| Number | Name | Date |
|---|---|---|
| 2,315,502 | Crecca et al. | Apr. 6, 1943 |
| 2,268,416 | Nelson | Dec. 30, 1941 |